(12) United States Patent
Okabayashi et al.

(10) Patent No.: US 9,857,918 B2
(45) Date of Patent: Jan. 2, 2018

(54) CONTENT DISPLAY CONTROL METHOD AND SYSTEM

(71) Applicant: FUJITSU LIMITED, Kawasaki-shi, Kanagawa (JP)

(72) Inventors: Keiju Okabayashi, Sagamihara (JP); Bin Chen, Machida (JP); Yusuke Yasukawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 15/045,726

(22) Filed: Feb. 17, 2016

(65) Prior Publication Data

US 2016/0291800 A1 Oct. 6, 2016

(30) Foreign Application Priority Data

Mar. 31, 2015 (JP) .................................. 2015-072083
Jul. 23, 2015 (JP) .................................. 2015-145871

(51) Int. Cl.
| | | |
|---|---|---|
| G06F 3/041 | (2006.01) | |
| G06F 3/042 | (2006.01) | |
| G06F 3/03 | (2006.01) | |
| G06F 3/038 | (2013.01) | |
| G06F 3/0354 | (2013.01) | |
| G06F 3/01 | (2006.01) | |

(52) U.S. Cl.
CPC ............ *G06F 3/0425* (2013.01); *G06F 3/017* (2013.01); *G06F 3/0304* (2013.01); *G06F 3/0386* (2013.01); *G06F 3/03542* (2013.01)

(58) Field of Classification Search
None
See application file for complete search history.

(56) References Cited

U.S. PATENT DOCUMENTS

| 5,594,468 A | 1/1997 | Marshall et al. |
|---|---|---|
| 2003/0169233 A1 | 9/2003 | Hansen |
| 2004/0207597 A1 | 10/2004 | Marks |

(Continued)

FOREIGN PATENT DOCUMENTS

| EP | 2 148 497 A1 | 1/2010 |
|---|---|---|
| JP | 10-177451 | 6/1998 |

(Continued)

OTHER PUBLICATIONS

Japanese Platform for Patent Information, English Abstract of Japanese Publication No. 2012-146228 published Aug. 2, 2012.

(Continued)

*Primary Examiner* — Joseph Haley
(74) *Attorney, Agent, or Firm* — Staas & Halsey LLP

(57) ABSTRACT

A content display control method includes displaying a content image on a screen, detecting reflection light of a beam of light reflected off the screen, the beam of light being emitted from a portable device onto the screen, selecting, based on the detected reflection light, a desired one of modes set in association with states of the reflection light changed in accordance with a distance between the screen and the portable device, detecting a user's operation in a period from selecting the mode to turning off the beam of light, based on the state of the reflection light in association with the selected mode, and controlling display of the content image on the screen based on the detected user's operation.

16 Claims, 25 Drawing Sheets

(56) References Cited

U.S. PATENT DOCUMENTS

| | | |
|---|---|---|
| 2007/0176908 A1 | 8/2007 | Lipman et al. |
| 2009/0040195 A1 | 2/2009 | Njolstad et al. |
| 2012/0044140 A1* | 2/2012 | Koyama ............... G06F 3/0325 345/157 |
| 2012/0182272 A1 | 7/2012 | Ooi et al. |
| 2012/0229450 A1* | 9/2012 | Kim ................. G06F 3/04815 345/419 |
| 2014/0166851 A1 | 6/2014 | Kim et al. |
| 2016/0041632 A1* | 2/2016 | Ono ..................... G06F 3/0428 345/175 |

FOREIGN PATENT DOCUMENTS

| | | |
|---|---|---|
| JP | 2007-527573 | 9/2007 |
| JP | 2011-204059 | 10/2011 |
| JP | 2012-146228 | 8/2012 |
| JP | 2013-33494 | 2/2013 |
| WO | 2007/113828 A2 | 10/2007 |
| WO | 2014/041548 A1 | 3/2014 |

OTHER PUBLICATIONS

Espacenet Abstract of Japanese Publication No. 10-177451 published Jun. 30, 1998.
Japanese Platform for Patent Information, English Abstract of Japanese Publication No. 2013-33494 published Feb. 14, 2013.
Japanese Platform for Patent Information, English Abstract of Japanese Publication No. 2011-204059 published Oct. 13, 2011.
PCT International Publication No. WO 2005/073838 published Aug. 11, 2005.
Extended European Search Report dated Sep. 20, 2016 in corresponding European Patent Application No. 16157029.6.
Partial European Search Report dated May 31, 2016 in corresponding European Patent Application No. 16157029.6.

\* cited by examiner

| SIZE OF LIGHT SPOT | CENTRAL LUMINANCE | MODE |
|---|---|---|
| s1~s2 | i1~i2 | MODE #1 |
| (s2+1)~s3 | (i2+1)~i3 | MODE #2 |
| (s3+1)~s4 | (i3+1)~i4 | MODE #3 |
| ... | ... | ... |

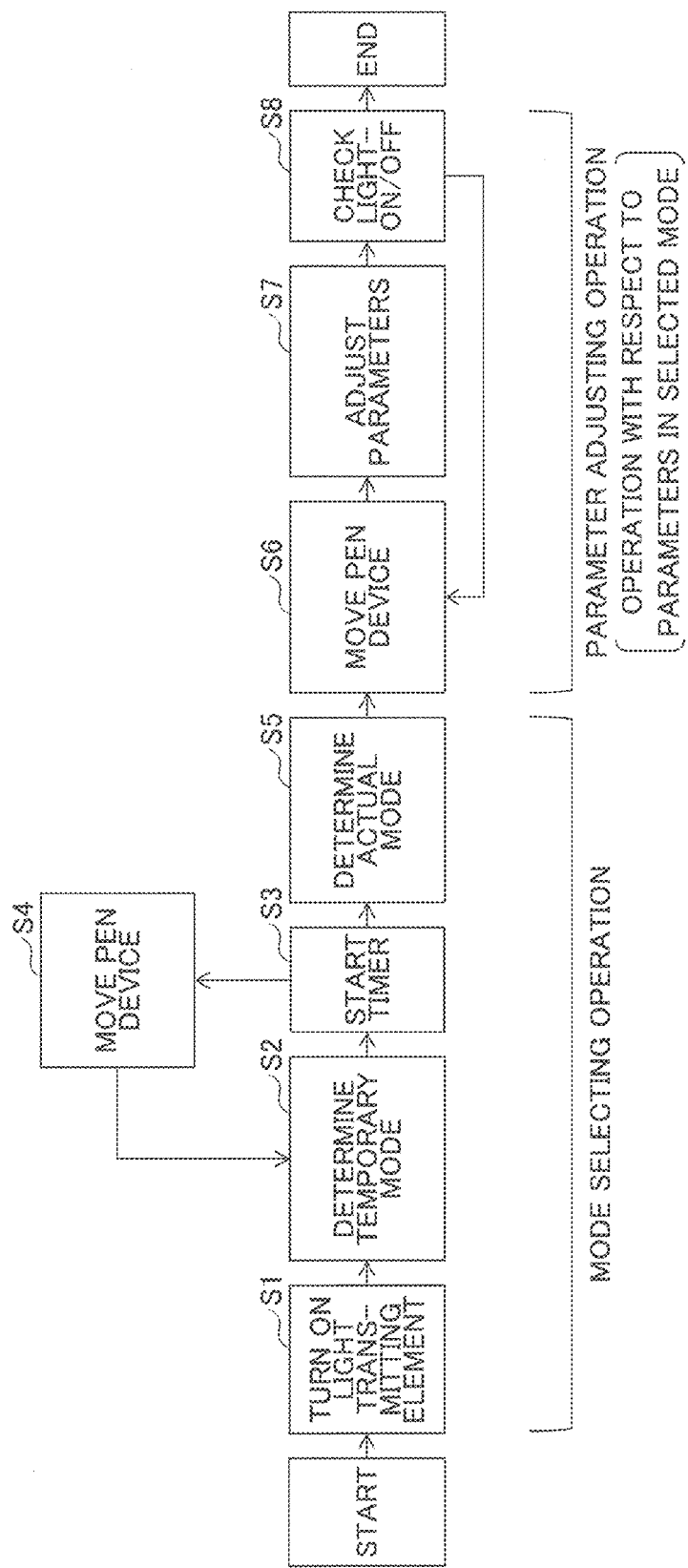

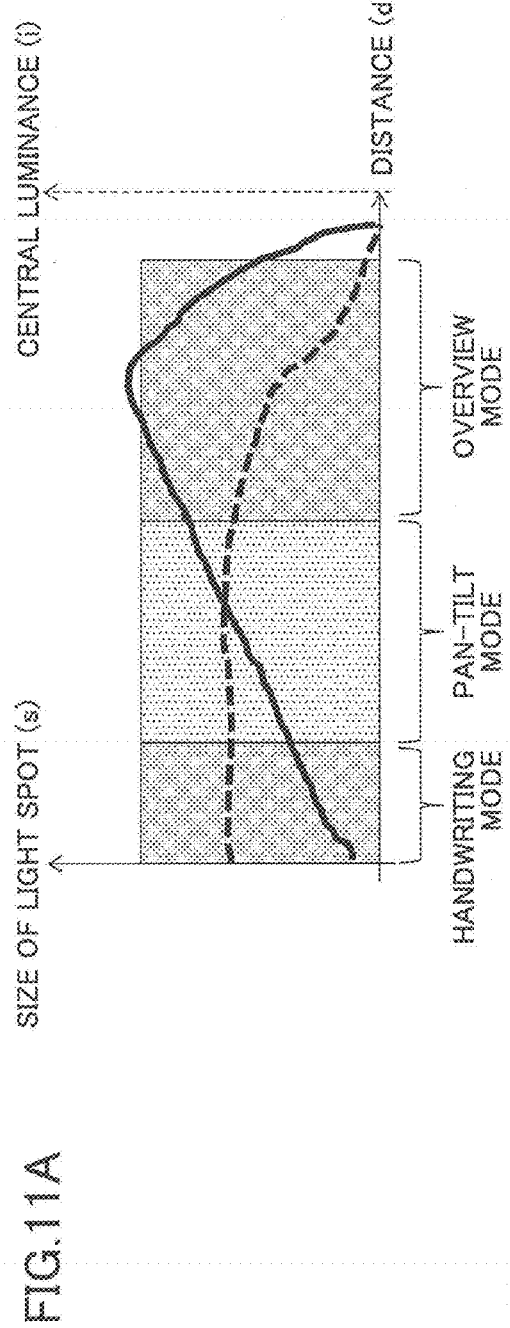

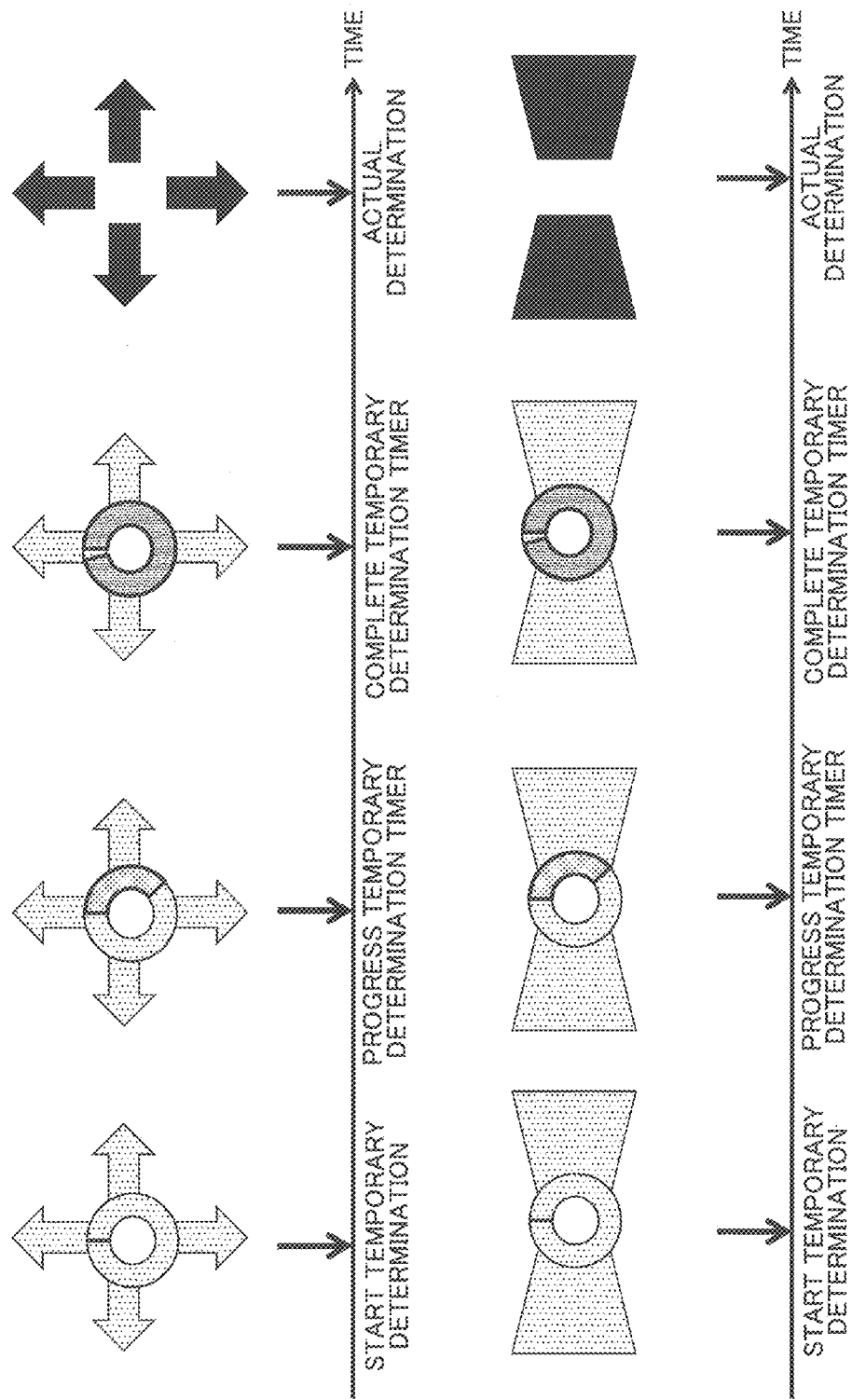

FIG.14

| MODE | PARAMETER | OPERATION ACTION | PARAMETER ADJUSTING METHOD |
|---|---|---|---|
| HANDWRITING MODE | NA | NA | NA |
| PAN-TILT MODE (CONTROL MODE OF HORIZONTALLY AND VERTICALLY MOVING VIRTUAL CAMERA VIEWPOINT) | PAN | VERTICALLY MOVE CENTER OF LIGHT SPOT | INCREMENT/DECREMENT PAN ANGLE |
| | TILT | HORIZONTALLY MOVE CENTER OF LIGHT SPOT | INCREMENT/DECREMENT TILT ANGLE |
| OVERVIEW MODE (CONTROL MODE OF MOVING VIRTUAL CAMERA VIEWPOINT FORWARD AND BACKWARD) | POSITION | MOVE CONTROL DEVICE 4 TOWARD OR AWAY FROM SCREEN 2 | MOVE VIRTUAL CAMERA POSITION TOWARD SCREEN 2 OR AWAY FROM SCREEN 2 | though
CONTENT DISPLAY CONTROL METHOD AND SYSTEM

CROSS-REFERENCE TO RELATED APPLICATIONS

This application is based upon and claims the benefit of priority of the prior Japanese Patent Application No. 2015-072083, filed on Mar. 31, 2015, and Japanese Patent Application No. 2015-145871, filed on Jul. 23, 2015, the entire contents of which are incorporated herein by reference.

FIELD

The embodiments discussed herein relate to a content display control method, and a content display control system.

BACKGROUND

Interactive whiteboards have been an active field of research in recent human-computer interaction (HCI) systems composed of various types of sensors, a projector, etc.

In the interactive whiteboard employing an electronic pen, users draw graphics or characters with the electronic pen on the board while the movements of the electronic pen within the board plane are tracked and detected by sensors, and the graphics or characters drawn by the users with the electronic pen are displayed within the board plane. Computer commands may be recognized based on lines of the movements of the electronic pen within the board plane to control the computer operations (e.g., Patent Documents 1 and 2).

The users' operations with the electronic pen on the related art interactive whiteboards are limited to two-dimensional operations; the users are generally not allowed to manipulate contents displayed on a screen of the interactive whiteboard.

RELATED-ART DOCUMENTS

Patent Documents

Patent Document 1: Japanese Laid-open Patent Publication No. 2011-204059
Patent Document 2: Japanese National Publication of International Patent Application No. 2007-527573

SUMMARY

According to an aspect of embodiments, there is provided a content display control method that includes displaying a content image on a screen; detecting reflection light of a beam of light reflected off the screen, the beam of light being emitted from a portable device onto the screen; selecting, based on the detected reflection light, a desired one of modes set in association with states of the reflection light changed in accordance with a distance between the screen and the portable device; detecting a user's operation in a period from selecting the mode to turning off the beam of light, based on the state of the reflection light in association with the selected mode; and controlling display of the content image on the screen based on the detected user's operation.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 10 a flowchart illustrating an example of a user's operation;
FIG. 11A is a graph illustrating examples of the different modes;
FIG. 11B is a corresponding table illustrating the examples of the different modes;
FIG. 13 includes diagrams illustrating examples of temporarily determined mode graphics and actually determined mode graphics with examples of timer graphics;
FIG. 14 is a diagram illustrating examples of parameters of each of the modes.

DESCRIPTION OF EMBODIMENTS

The following describes embodiments with reference to the accompanying drawings.

Configuration

Figure 1:
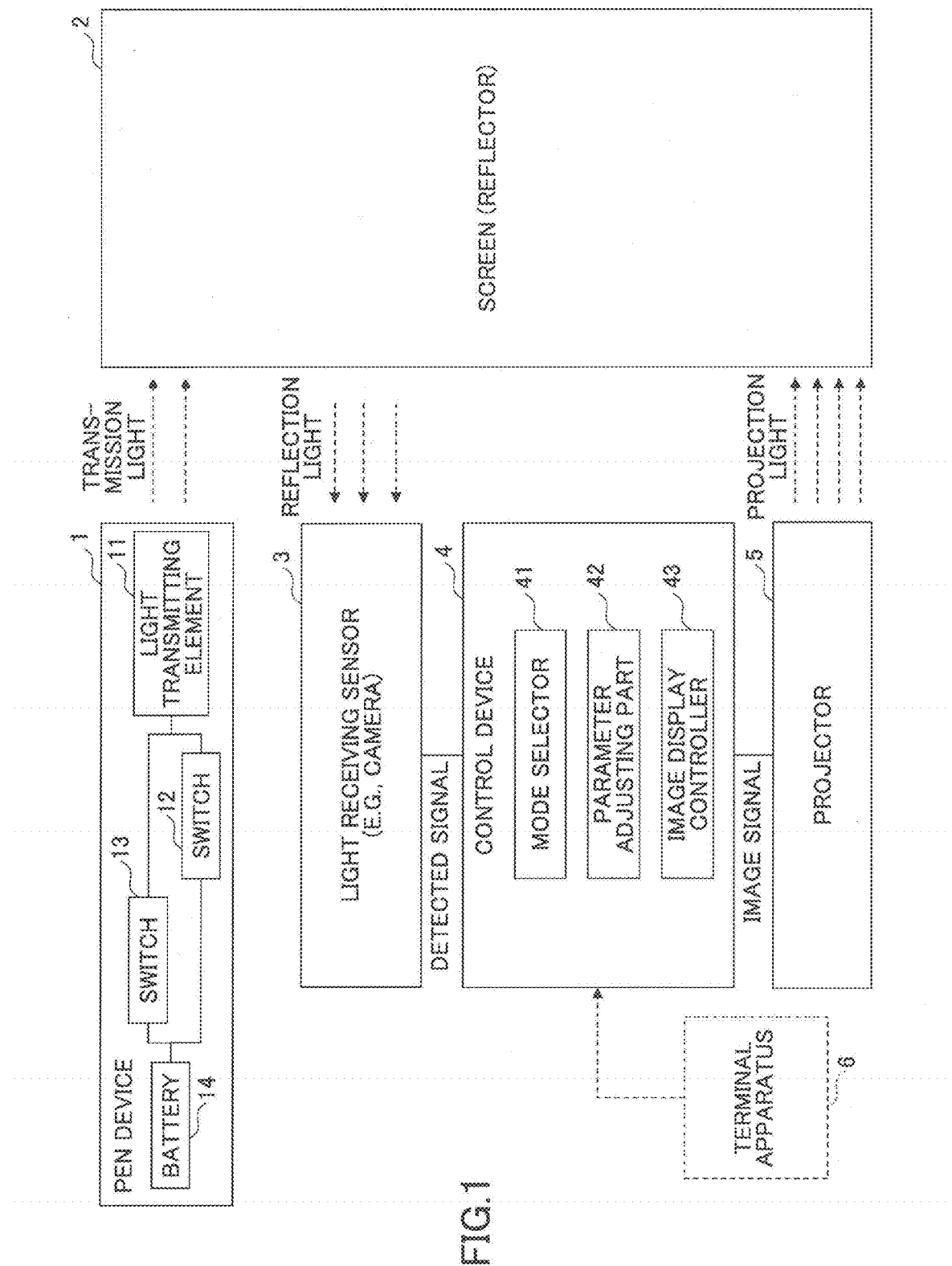
FIG. 1 is a diagram illustrating a configuration example of a system according to an embodiment.

FIG. 1 is a diagram illustrating a configuration example of a system according to an embodiment. FIG. 1 illustrates a system that includes a pen device 1 configured to transmit light beams such as infrared light, a screen (reflector) 2 configured to receive the light beams transmitted from the pen device (a portable device) 1, and a light receiving sensor 3 configured to detect light reflected (reflection light/scattering reflection light) from the screen 2. An example of the light receiving sensor 3 may be an infrared camera, and the detected signals, in this case, correspond to captured images. The system further includes a control device 4 configured to recognize a user's operation based on the signals detected by the light receiving sensor 3, and to generate image signals of content from the own device or an external terminal apparatus 6, and a projector 5 configured to project the image signals output from the control device 4 onto the screen 2.

The pen device 1 includes a light transmitting element 11, switches 12 and 13, and a battery 14. Turning one of the switches 12 and 13 on will supply the electric power from the battery 14 to the light transmitting element 11, causing the light transmitting element 11 to emit light. Details will be described later.

The control device 4 includes a mode selector 41 configured to select an operation mode based on the detected signals of the light receiving sensor 3, a parameter adjusting part 42 configured to adjust mode-specific parameters under the selected mode, and an image display controller 43 configured to control image display based on the adjusted parameters.

Figure 2:
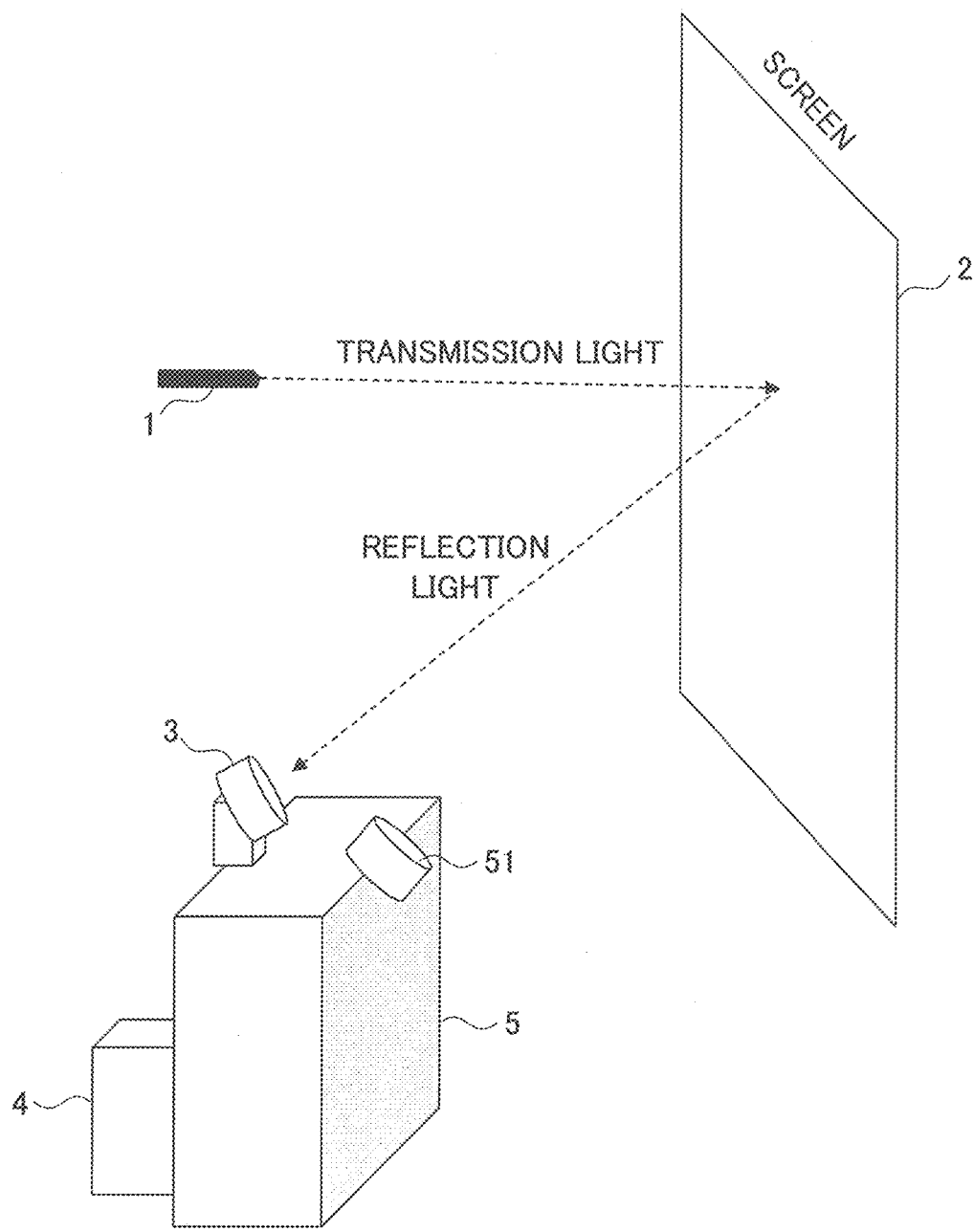
FIG. 2 is a diagram illustrating an example of appearance of the system.

FIG. 2 is a diagram illustrating an example of appearance of the system. In the example of FIG. 2, the projector 5 having a projection lens 51 is disposed at a lower part of the screen 2, the projection lens 51 is directed toward the screen 2, and the light receiving sensor 3 is disposed to focus on the screen 2 as a field of view so as to receive light reflected from the pen device 1. The projector 5 includes the control device 4.

The control device 4 includes a hardware configuration of general computers. Specifically, the control device 4 includes a central processing unit (CPU), a read only memory (ROM), a random access memory (RAM), a non-volatile random access memory (NVRAM), an auxiliary storage device, a wireless interface, and the like.

Figure 3A:
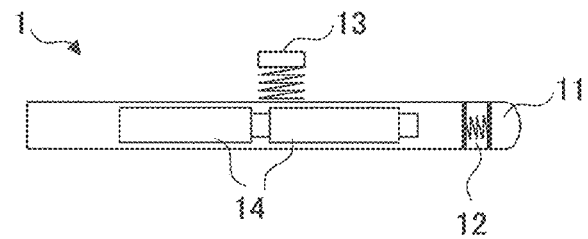
FIGS. 3A to 3C are diagrams illustrating configuration examples of a pen device.
Figure 3B:
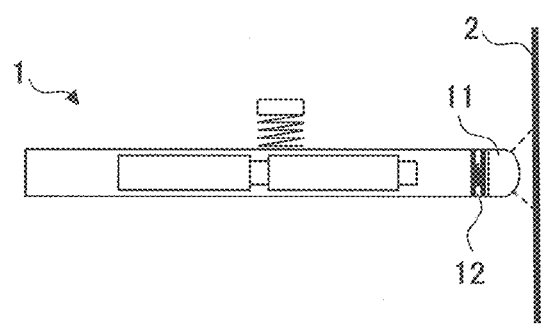
Figure 3C:
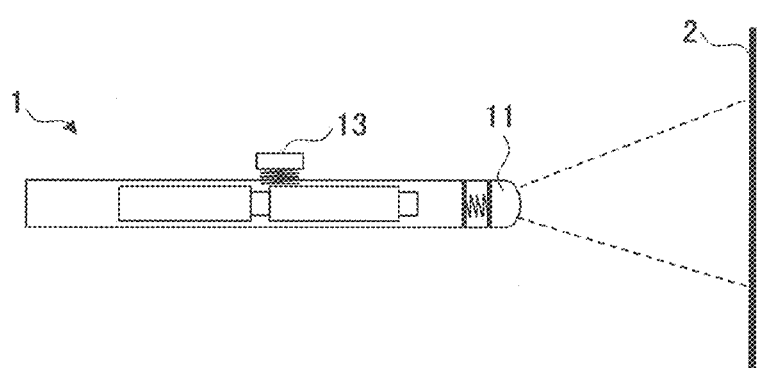

FIGS. 3A to 3C are diagrams illustrating a configuration example of the pen device 1. FIG. 3A illustrates the switches 12 and 13 both turned off, not allowing the light transmitting element 11 at the point of the pen device 1 to emit light. FIG. 3B illustrates the point of the pen device 1 being pressed on the screen 2 to turn the switch 12 on, allowing the light transmitting element 11 to emit light. FIG. 3C illustrates a user turning the switch 13 on, allowing the light transmitting element 11 to emit light.

Mode, Light Spot Size, Central Luminance

Figure 4A:
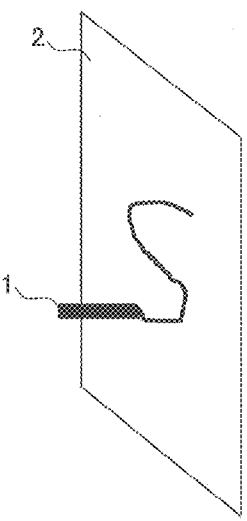
FIGS. 4A to 4C are diagrams illustrating examples of expected operations.
Figure 4B:
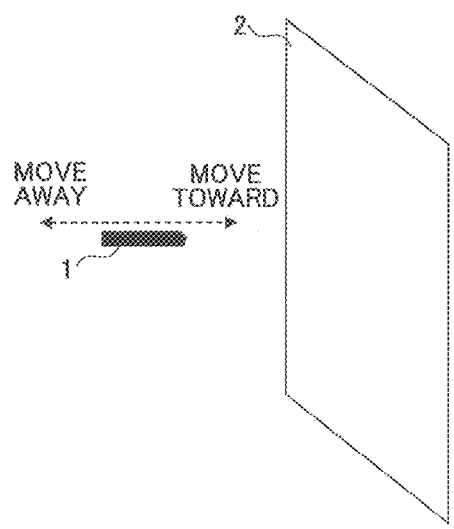
Figure 4C:
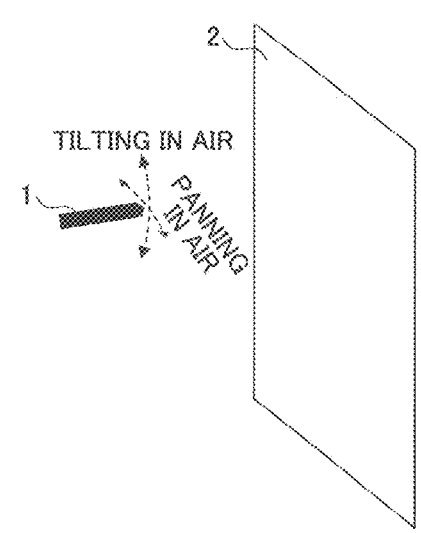

FIGS. 4A to 4C are diagrams illustrating examples of expected operations. FIG. 4A indicates a drawing operation to allow a user to press the pen device 1 on the screen 2. FIG. 4B indicates a horizontally moving operation to move the pen device 1 back and forth (move toward and move away from the screen 2) while the pen device 1 has a distance from the screen 2. FIG. 4C indicates a vertically moving operation to move the pen device 1 leftward and rightward (panning in the air), or move the pen device 1 upward and downward (tilting in the air) while the pen device 1 has a distance from the screen 2. Note that the pen device 1 operations performed in the air are not limited to those illustrated above (see FIGS. 4B and 4C).

Figure 5A:
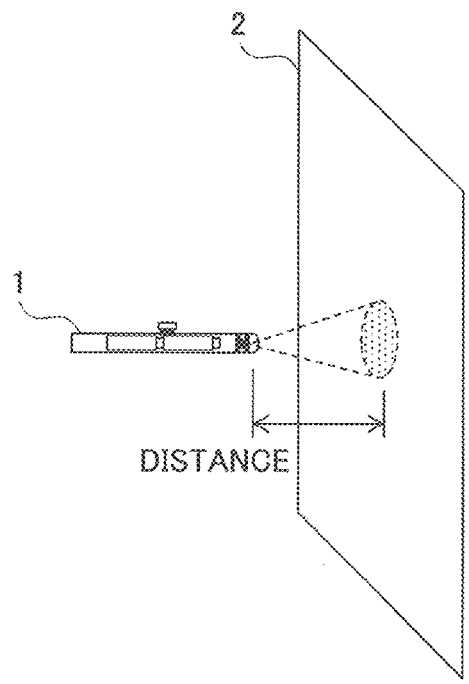
FIGS. 5A and 5B are diagrams illustrating characteristics of a light spot on a screen.
Figure 5B:
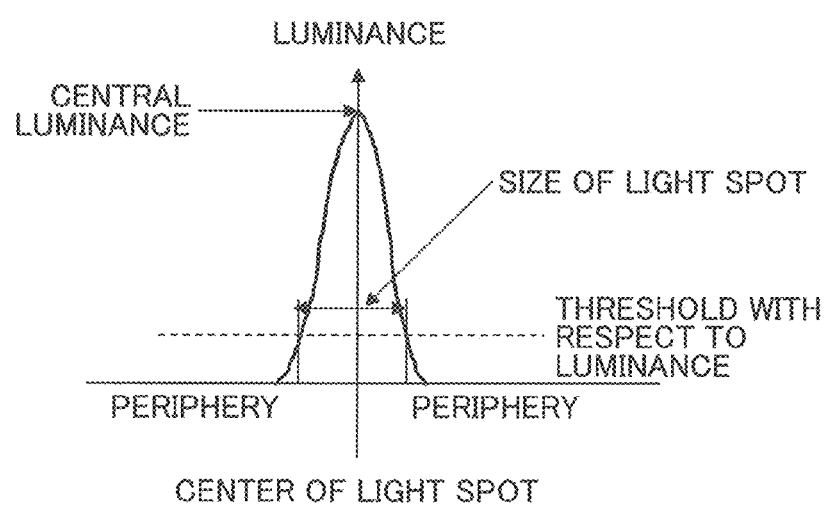

FIGS. 5A and 5B are diagrams illustrating characteristics of a light spot on the screen 2. FIG. 5A illustrates a distance between the screen 2 and pen device 1, and FIG. 5B depicts the luminance range from the center of the light spot to the periphery of the light spot on the screen 2 of the example of FIG. 5A. The center of the light spot has the highest luminance, which gradually lowers toward the periphery of the light spot. The light spot size is defined as a distance on the screen 2 at which luminance reaches a predetermined threshold. The luminance of the center of the light spot is called a "central luminance".

Figure 6:
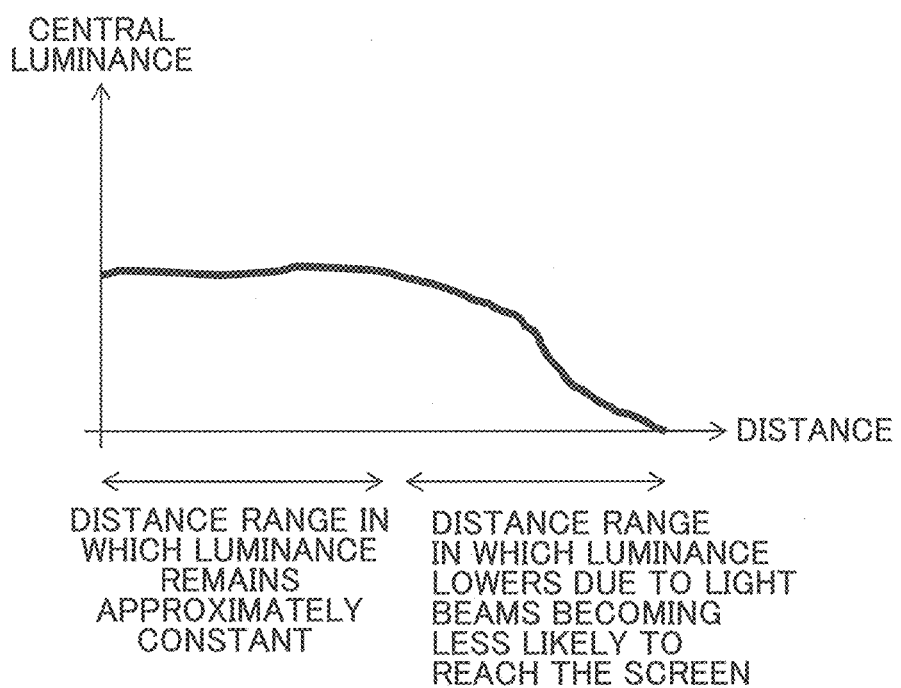
FIG. 6 is a graph illustrating an example of the central luminance of the light spot with respect to the distance between the pen device and the screen.

FIG. 6 is a graph illustrating an example of the central luminance of the light spot with respect to the distance between the pen device 1 and the screen 2. The graph illustrates the central luminance that remains constant from the distance 0 approximately to a predetermined value, but gradually lowers from the distance exceeding the predetermined value because rays of light are less likely to reach the screen to be visible on the screen.

Figure 7:
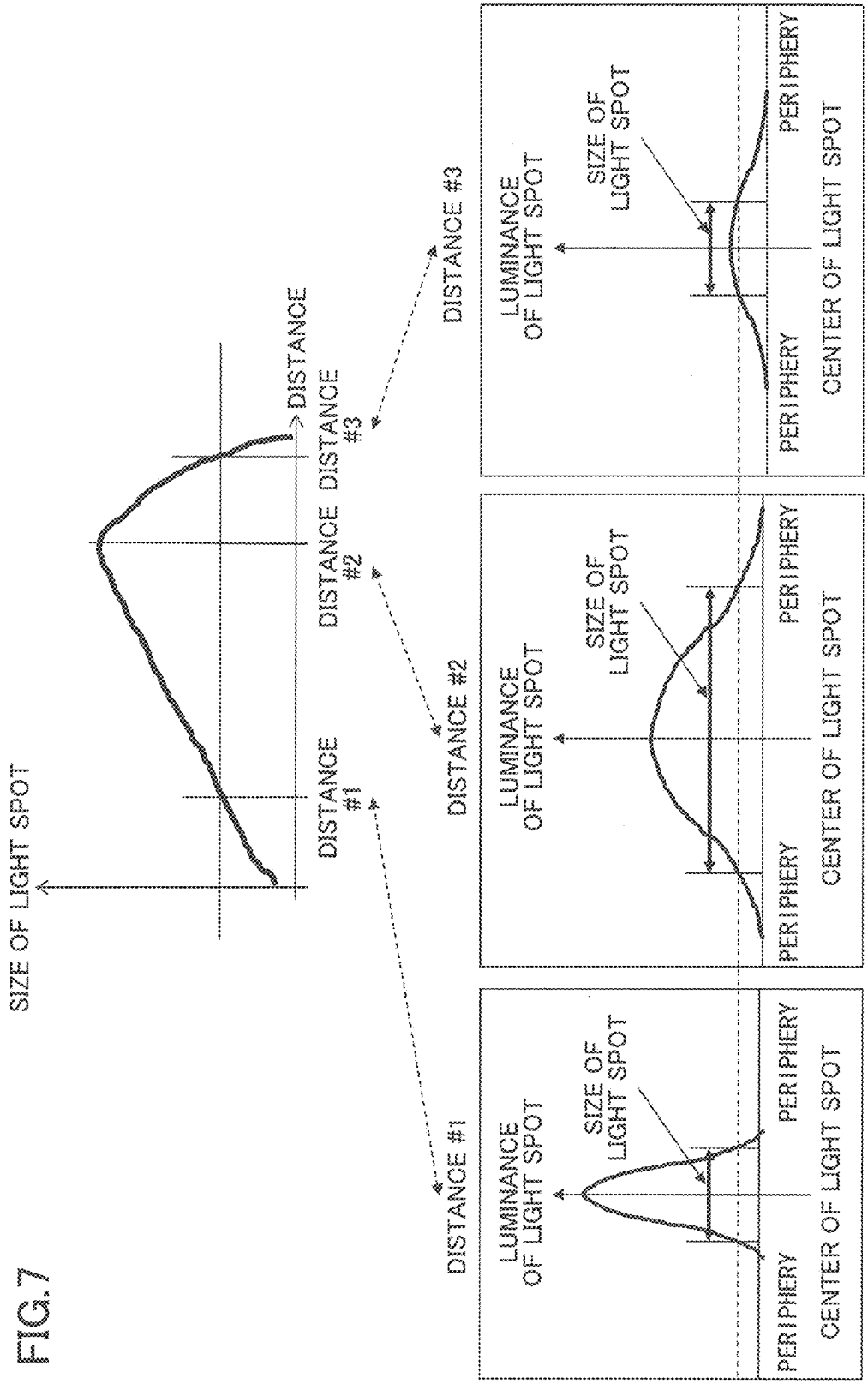
FIG. 7 is a graph illustrating an example of the size of the light spot with respect to the distance between the pen device and the screen.

FIG. 7 is a graph illustrating an example of the central luminance of the light spot with respect to the distance between the pen device 1 and the screen 2. The lower left graph of FIG. 7 illustrates that the size of the light spot on the screen 2 is small at the distance #1 close to the screen 2, and the lower middle graph illustrates that the size of the light spot on the screen 2 becomes large at the distance #2 away from the screen 2. The lower right graph illustrates that the size of the light spot on the screen 2 becomes smaller again at the distance #3 away from the screen 2 because the luminance becomes less likely to reach the threshold for maintaining the size of the light spot. The upper graph of FIG. 7 illustrates an example of the change in the size of the light spot in accordance with the distance.

Figure 8:
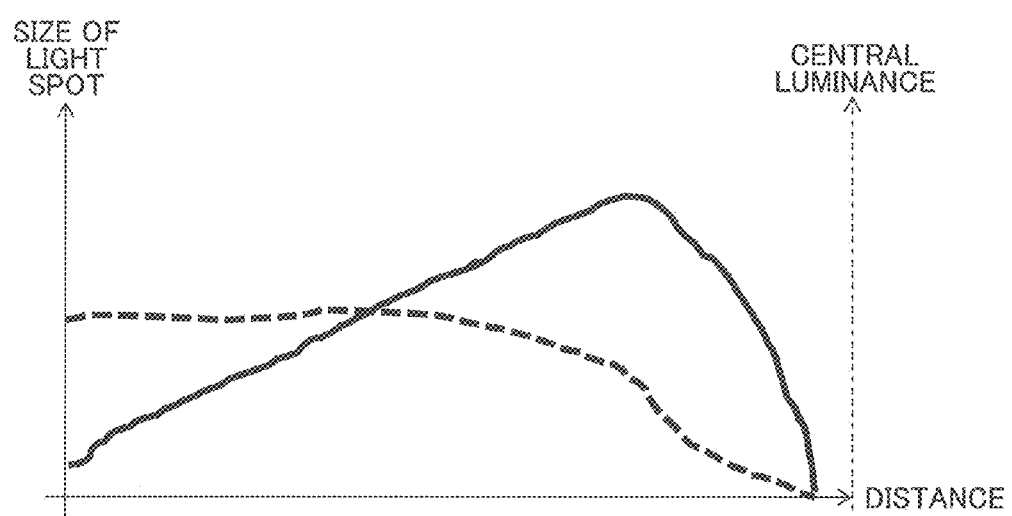
FIG. 8 is a graph illustrating an example of the size of the light spot and the central luminance with respect to the distance between the pen device and the screen.

FIG. 8 is a graph illustrating an example of the size of the light spot with respect to the distance between the pen device 1 and the screen 2, where a solid line represents the size of a light spot and a broke linen represents the central luminance. The graph illustrates that the distance may fail to be specified by the size of the light spot alone because the light spot of the same size corresponds to two different distances. The graph further illustrates that the distance may also fail to be specified by the central luminance alone because the change in the size of the light spot is gradual; however, the distance may be specified by combining the size of the light spot and the central luminance.

Figures 9A, 9B:
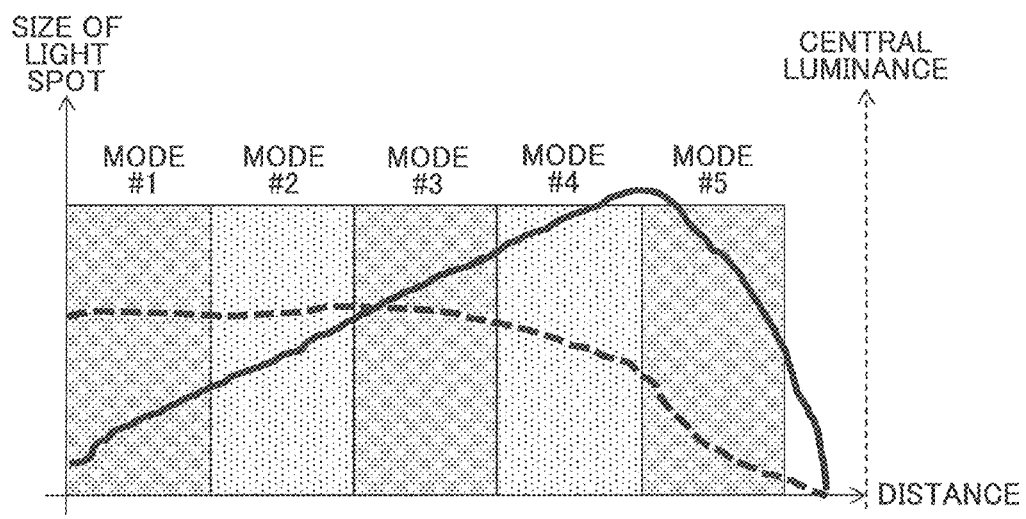
FIG. 9A is a graph illustrating a relationship between respective modes in association with the distance, the size of the light spot, and the central luminance.
FIG. 9B is a corresponding table illustrating a relationship between the modes, the size of the light spot, and the central luminance.

FIG. 9A is a graph illustrating a relationship between respective modes in association with the distance, the size of the light spot, and the central luminance, and FIG. 9B is a corresponding table illustrating a relationship between the modes, the size of the light spot, and the central luminance. FIG. 9A illustrates an example in which mode #1 to mode #5 are associated with the distance from 0 to the maximum distance. Note that the number of modes may be any number. FIG. 9B is an example of a corresponding table illustrating a relationship between the size of the light spot, the central luminance range, and the mode when the modes are defined as illustrated in FIG. 9A. In this example, the mode may be specified from the corresponding table based on the observations of the size of the light spot and the central luminance without computing the distance.

User's Operation

FIG. 10 a flowchart illustrating an example of a user's operation. In FIG. 10, when the user operates the pen device 1 to turn on the light transmitting element 11 (step S1), the mode is temporarily determined based on the observation of the light spot on the screen 2 (step S2). Note that the light transmitting element 11 may be turned on by pressing the point of the pen device 1 on the screen 2, and by the user's intentional turning on the light transmitting element 11.

After the mode is temporarily determined, a timer starts measuring the time (step S3). When the user moves the pen device 1 again during the time being measured (step S4), the mode is temporarily determined again (step S2). When the time is up, the mode is actually determined (step S5). Steps S1 to S5 illustrate a mode selection operation.

When the user subsequently moves the pen device 1 (step S6), parameters are adjusted corresponding to the mode (step S7). When the light of the pen device 1 (the light transmitting element 11) continues to be on, the parameters may be adjusted in accordance with the movements of the pen device 1 (steps S8, S6, and S7) while the selected mode remains unchanged. When the light of the pen device 1 (the light transmitting element 11) is turned off, the process ends. Steps S6 to S8 after the mode selection correspond to the parameter adjusting operation.

Mode Selection Process

The following describes a detailed process based on three examples of the modes, namely, a "handwriting mode", a "pan-tilt mode" and an "overview mode".

FIG. 11A is a graph illustrating examples of the different modes, and FIG. 11B is a corresponding table illustrating the examples of the different modes. FIG. 11A is a graph illustrating a relationship between the size s of the light spot and the central luminance i with respect to the distance d, where the minimum distance d to the maximum distance d are assigned to the "handwriting mode", the "pan-tilt mode", and the "overview mode" in this order. The "handwriting mode" indicates a mode in which the user presses the pen device 1 on the screen 2 to perform a drawing operation. The "pan-tilt mode" indicates a mode in which a viewpoint of a virtual camera when an image is displayed three-dimensionally moves horizontally or vertically. The "overview mode" indicates a mode in which a viewpoint of the virtual camera when an image is displayed three-dimensionally moves forward and backward.

FIG. 11B is a corresponding table in which the size range of the light spot and the central luminance range are in association with the different modes. Note that the corresponding table defines respective graphics of the temporarily determined different modes displayed on the screen and respective graphics of the actually determined different modes displayed on the screen, and the length of the timer for shifting from the temporarily determined mode to the actually determined mode.

Figure 12:
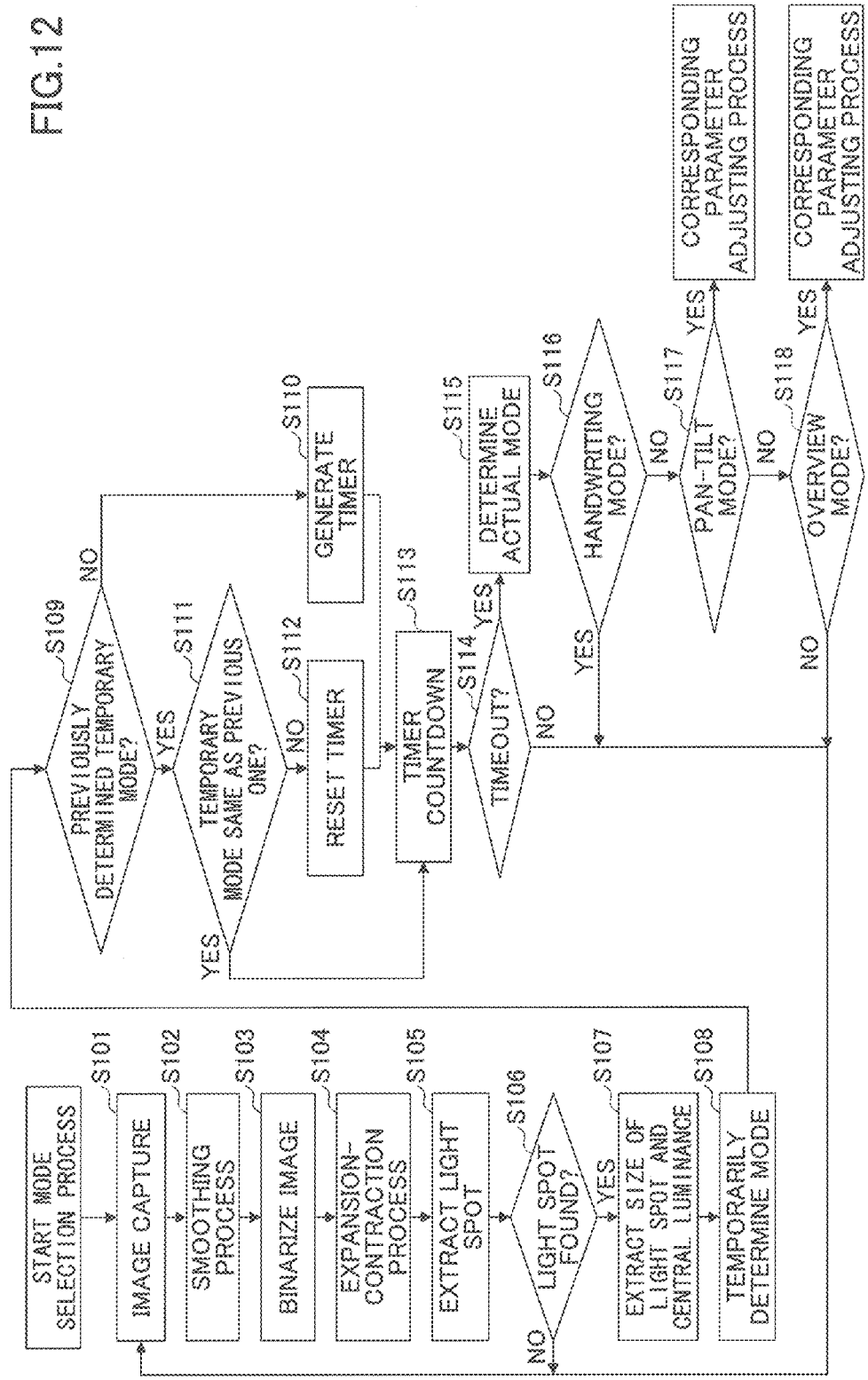
FIG. 12 is a flowchart illustrating an example of a mode selection process.

FIG. 12 is a flowchart illustrating an example of the mode selection process of the control device 4 corresponding to the user's mode selection operation. In FIG. 12, when the control device 4 starts the mode selection process, the control device 4 acquires an image (image capture) from the captured image of the light receiving sensor 3 (step S101).

The control device 4 subsequently performs a smoothing process on the acquired image as a preprocess (step S102), binarizes the image (step S103), and then performs an expansion-contraction process on the image (step S104). The expansion-contraction process indicates a process of expanding the image that has been contracted to effectively remove noise pixels.

The control device 4 subsequently extracts a light spot from the preprocessed image (step S105). The extraction of the light spot may be performed by extracting a group of pixels having high luminance in the image. Note that the light receiving sensor 3 images the infrared light beams transmitted from the pen device 1 alone, and hence, the captured image will not be affected by the light projected (projection light) from the projector 5.

The control device 4 subsequently determines whether there is a light spot (step S106). When there is no light spot (NO in step S106), the control device 4 proceeds with the image capture step (step S101).

When there is a light spot (YES in step S106), the control device 4 extracts the size of the light spot and the central luminance from the image (step S107).

The control device 4 subsequently compares the extracted size of the light spot and the central luminance with the corresponding size range of the light spot and the central luminance range in the corresponding table illustrated in FIG. 11B, and specifies the mode corresponding to the extracted size of the light spot and the central luminance in the corresponding table to determine the temporarily determined mode (step S108).

The control device 4 subsequently determines whether there is a previously determined temporarily determined mode (step S109). When there is no previously determined temporarily determined mode (NO in step S109), the control device 4 generates the timer (step S110). The setting (value) for the length of the timer maybe determined corresponding to the mode in the corresponding table.

Note that the control device 4 displays graphics illustrated on the left side of FIG. 13 each at the position of the center of the light spot on the screen 2 to determine the temporarily determined mode and generate the timer. The upper part graphics of FIG. 13 represent a pan-tilt mode, and the lower part graphics of FIG. 13 represent an overview mode. In FIG. 13, a doughnut chart-shape timer graphic is displayed in the middle of a temporarily determined mode display graphic specified by the corresponding table. The timer graphic displays a gauge that extends clockwise from the top along with the countdown of the timer, and reaches full by timeout. Note that the corresponding table does not specify the temporarily determined mode display graphics in the handwriting mode, and the length of the timer is 0. Hence, the graphics in the handwriting mode will directly become actually determined mode graphics without displaying the temporarily determined mode graphics, thereby immediately displaying the actually determined mode graphics.

Referring back to FIG. 12, when there is a previously determined temporarily determined mode (YES in step S109), the control device 4 determines whether the present mode is the same as the previously determined temporarily determined mode (step S111). When the present mode is not the same as the previously determined temporarily determined mode (NO in step S111), the control device 4 resets the timer (step S112).

After generating the timer (step S110) or resetting the timer (step S112), or when the present graphic is the same as the previously determined temporary graphic (YES in step S111), the control device 4 starts the timer countdown (step S113).

The control device 4 subsequently determines whether the timer has been timed out (step S114). When the timer has not been timeout (NO in step S114), the control device 4 proceeds with the image capture step (step S101).

When the timer has been timed out (YES in step S114), the control device 4 determines the temporarily determined mode as an actually determined mode (step S115). In this case, the control device 4 deletes the timer graphics, and changes the temporarily determined mode graphics to the actually determined mode graphics illustrated on the right part of FIG. 13. The examples of FIG. 13 illustrate the temporarily determined mode graphics with a pale color and the actually determined mode graphics with a dark color.

Referring back to FIG. 12, when the handwriting mode is determined as the actually determined mode (YES in step S116), there are no corresponding adjusting parameters, and the control device 4 thus returns to the image capture step (step S101). Alternatively, the control device 4 proceeds with a corresponding one of the parameter adjusting processes in the pan-tilt mode (YES in step S117) and the overview mode (YES in step S118).

FIG. 14 is a diagram illustrating examples of parameters of the different modes, where the handwriting mode has no adjustment parameters as described above. The pan-tilt mode has adjustment parameters for the pan angle and the tilt angle of a virtual camera. The overview mode has adjustment parameters for moving the virtual camera forward and backward.

Parameter Adjusting Process

Figure 15:
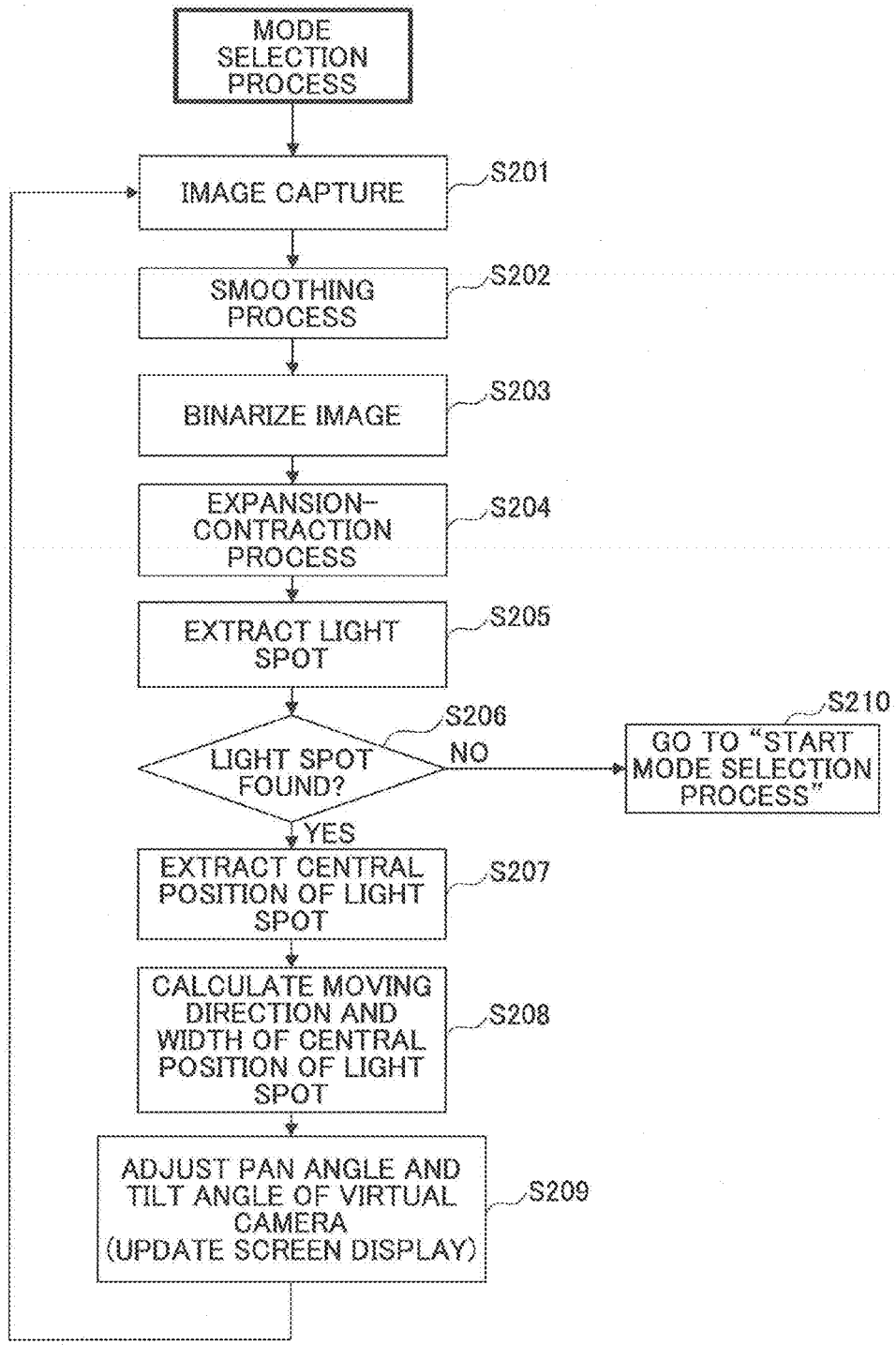
FIG. 15 is a flowchart illustrating an example of a parameter adjusting process in a pan-tilt mode.

FIG. 15 is a flowchart illustrating an example of a parameter adjusting process in the pan-tilt mode. In FIG. 15, when the control device 4 starts the parameter adjusting process in the pan-tilt mode after the mode selection process, the control device 4 acquires an image (image capture) from the captured image of the light receiving sensor 3 (step S201).

The control device 4 subsequently performs a smoothing process on the acquired image as a preprocess (step S202), binarizes the image (step S203), and then performs an expansion-contraction process on the image (step S204).

The control device 4 subsequently extracts a light spot from the preprocessed image (step S205).

The control device 4 subsequently determines whether there is a light spot (step S206). When there is a light spot (YES in step S206), the control device 4 detects the central position of the light spot from the image (step S207).

The control device 4 subsequently calculates a moving direction and a moving width of the central position of the light spot (step S208), and adjusts a pan angle and a tilt angle of the virtual camera (step S209). The image display is thus updated. The control device 4 then returns to the image capture step (step S201).

When there is no light spot (NO in step S206), the control device 4 returns to the "start mode selection process" (see FIG. 12) (step S210).

Figure 16:
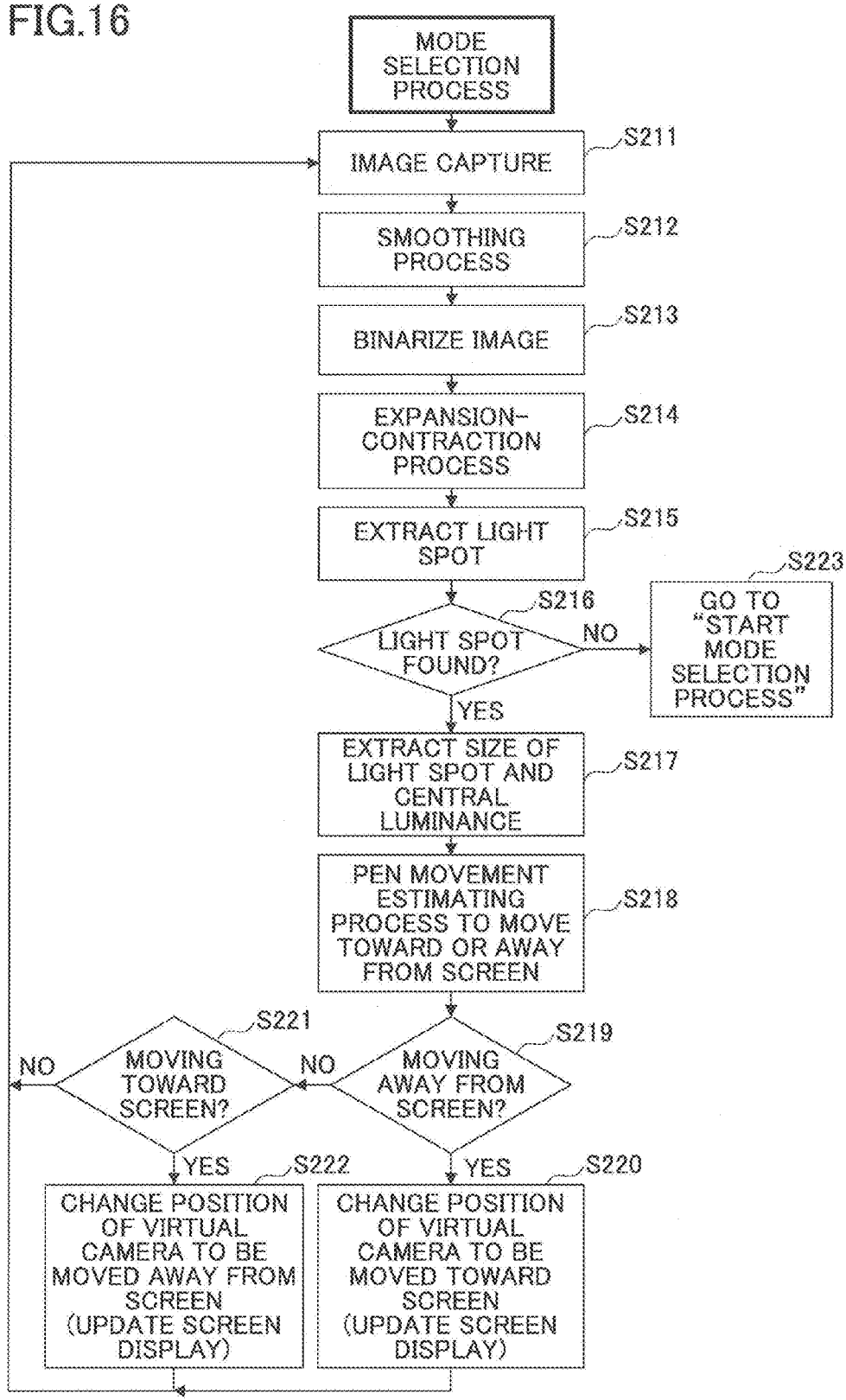
FIG. 16 is a flowchart illustrating an example of a parameter adjusting process in an overview mode.

FIG. 16 is a flowchart illustrating an example of a parameter adjusting process in the overview mode. In FIG. 16, when the control device 4 starts the parameter adjusting process in the overview mode after the mode selection process, the control device 4 acquires an image (image capture) from the captured image of the light receiving sensor 3 (step S211).

The control device 4 subsequently performs a smoothing process on the acquired image as a preprocess (step S212), binarizes the image (step S213), and then performs an expansion-contraction process on the image (step S214).

The control device 4 subsequently extracts a light spot from the preprocessed image (step S215).

The control device 4 subsequently determines whether there is a light spot (step S216). When there is a light spot (YES in step S216), the control device 4 extracts the size of the light spot and the central luminance from the image (step S217).

The control device 4 subsequently estimates the movements of the pen device 1; that is, the control device 4 determines whether the pen device 1 moves close to or moves away from the screen 2 (step S218). This step may be performed using an HMM (Hidden Markov Model).

When the control device 4 estimates the movements of the pen device 1 as moving away from the screen 2 (YES in step S219), the control device 4 changes the position of the virtual camera to move close to the screen 2 (step S220). The image display is thus updated.

On the other hand, when the control device 4 estimates the movements of the pen device 1 as moving closer to the screen 2 (YES in step S221), the control device 4 changes the position of the virtual camera to move away from the screen 2 (step S222). The image display is thus updated.

The control device 4 returns to the image capture step (step S211) after the adjustment of the virtual camera position (steps S220, or S222), or when the movements of the pen device 1 are not estimated (NO in step S221).

Operation Example

Figure 17A:
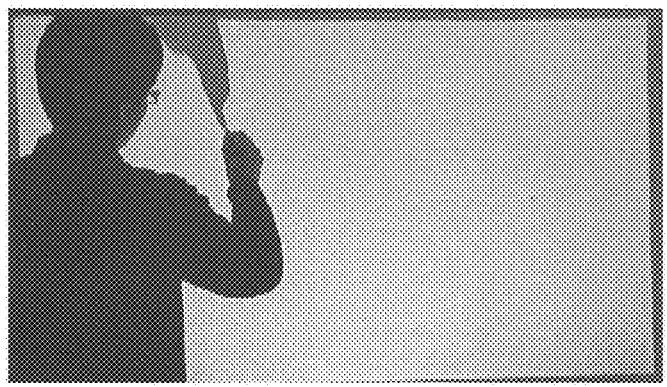
FIGS. 17A to 17C are diagrams illustrating examples of a handwriting mode.
Figure 17B:
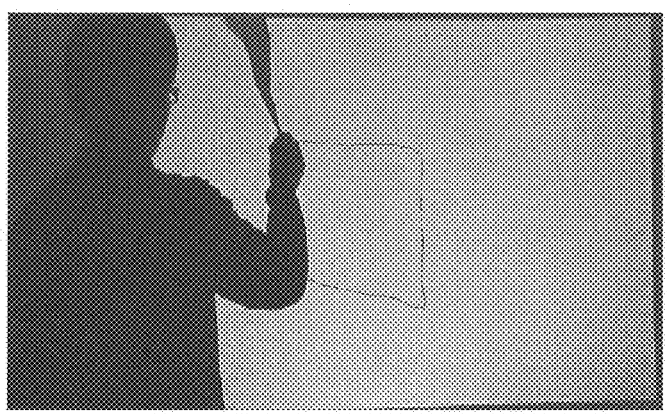
Figure 17C:
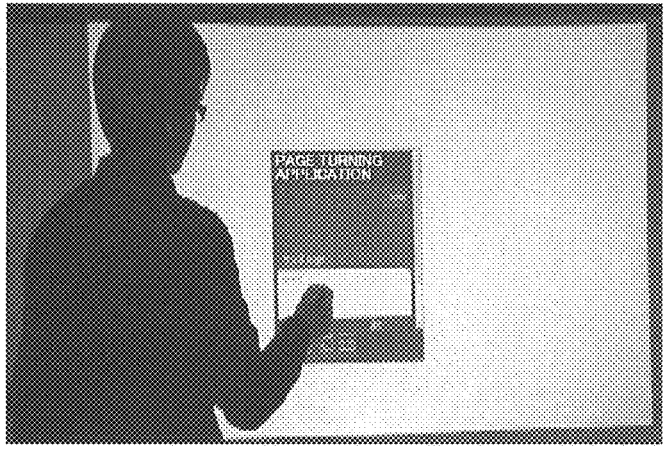

FIGS. 17A to 17C are diagrams illustrating examples of the handwriting mode. FIG. 17A illustrates a state in which a user presses the pen device 1 on the screen 2 to emit light from the pen device 1, thereby starting drawing. This state selects the "handwriting mode" based on the size of the light spot and the central luminance.

FIG. 17B illustrates a state in which the user continuously performs drawing with the pen device 1, thereby drawing a square frame.

FIG. 17C illustrates a state in which the user applies the drawn frame as a window frame to display an application screen, based on the control of a host application.

Figure 18A:
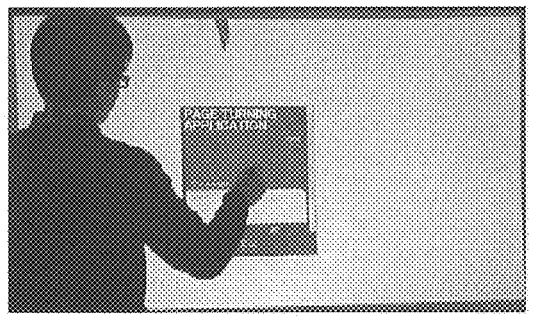
FIGS. 18A to 18D are diagrams illustrating examples of the overview mode (from a plane display to an overview display)
Figure 18B:
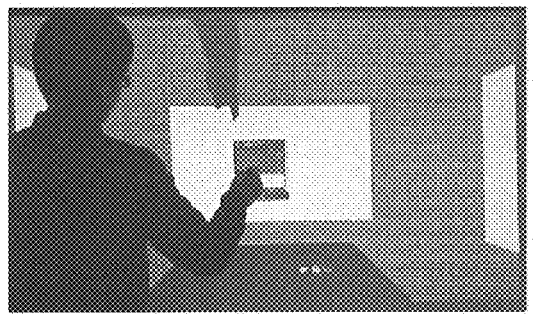

FIGS. 18A to 18D are diagrams illustrating examples of the overview mode (from a plane display to an overview display). FIG. 18A illustrates a state in which the user turns the light of the pen device 1 on at a position fairly away from the screen 2 to select the "overview mode", and moves the pen device 1 toward the screen 2 (moves the pen device 1 close to the screen 2). This operation zooms out the image in a depth direction, thereby displaying a three-dimensional image as illustrated in FIG. 18B. The overview mode not only displays a front screen in front of the user but also displays the screens on the left and the right of the user on the front screen to display the screens three-dimensionally.

In FIG. 18B, the user moves forward the pen device 1 while still turning the light of the pen device 1 on to adjust a back and forth position (the depth direction) of the virtual camera to move away from the screen 2. This operation zooms out the image, resulting in a state illustrated in FIG. 18C.

Figure 18C:
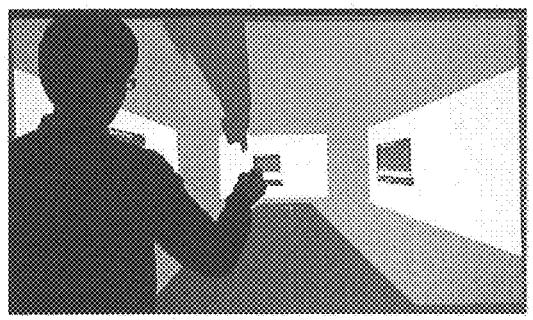
Figure 18D:
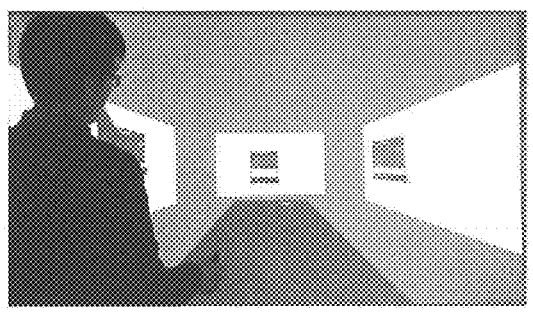

In FIG. 18C, the user further moves forward the pen device 1 while still turning the light of the pen device 1 on, further zooming out the image to result in a state illustrated in FIG. 18D. In FIG. 18D, the user turns the light of the pen device 1 off, thereby ending the adjustment of the depth of the three-dimensional display.

Figure 19A:
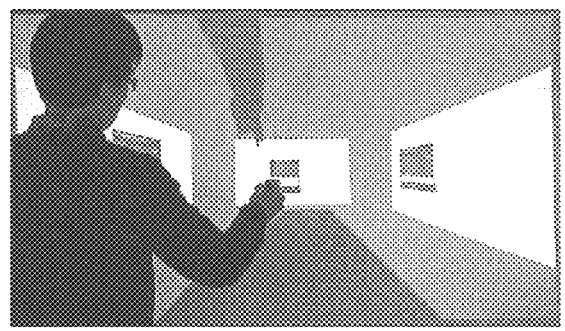
FIGS. 19A to 19C are diagrams illustrating examples of the pan-tilt mode.
Figure 19B:
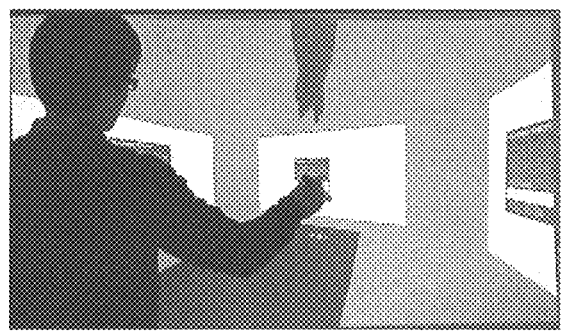
Figure 19C:
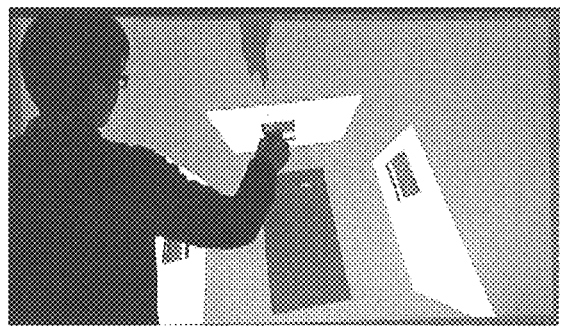

FIGS. 19A to 19C are diagrams illustrating examples of the pan-tilt mode. FIG. 19A illustrates a state in which the user turns the light of the pen device 1 on at a position at which the user is not in contact with the screen 2, thereby selecting the "pan-tilt mode".

FIG. 19B illustrates a state in which the user moves the pen device 1 in a rightward direction while still turning the light of the pen device 1 on to adjust the viewpoint of the virtual camera in the rightward direction, thereby viewing the image from the rightward direction.

FIG. 19C illustrates a state in which the user moves the pen device 1 in an upward direction while still turning the light of the pen device 1 on to adjust the viewpoint of the virtual camera in the upward direction, thereby viewing the image from the upward direction.

Figure 20A:
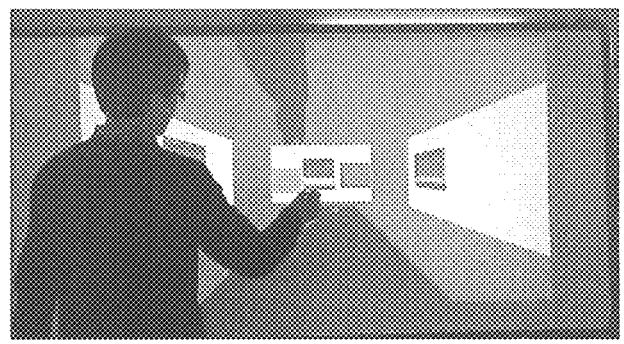
FIGS. 20A to 20C are diagrams illustrating examples of the overview mode (from a plane display to an overview display)
Figure 20B:
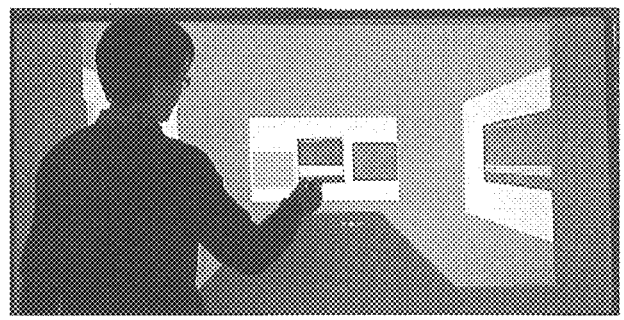
Figure 20C:
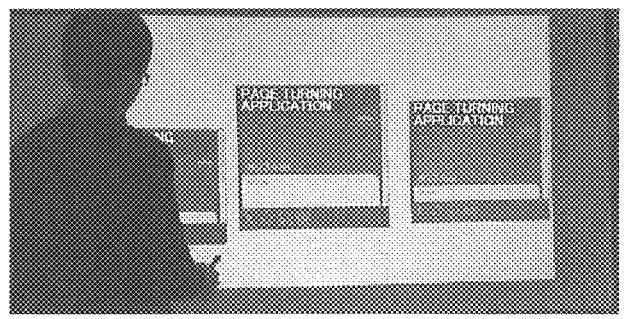

FIGS. 20A to 20C are diagrams illustrating examples of the overview mode (from a plane display to an overview display). FIG. 20A illustrates a state in which the user turns the light of the pen device 1 on at a position at which the user is fairly away from the screen 2, thereby selecting the "overview mode".

FIG. 20B illustrates a state in which the user moves the pen device 1 away from the screen 2 while still turning the light of the pen device 1 on, thereby zooming in on the image in front of the user again. The three-dimensional display ends finally, thereby returning to the normal display as illustrated in FIG. 20C.

Another Configuration Example of Pen Device

As already illustrated with reference to FIG. 7, the size of the light spot linearly increases while the distance between the pen device 1 and the screen 2 is from the smaller distance to the predetermined value (the distance #2). Using such characteristics, the distance may be determined based on the size of the light spot. The configuration example of the pen device 1 illustrated in FIG. 3 may allow the battery 14 to directly supply power to the light transmitting element 11 via the switches 12 and 13, thereby approximately maintaining constant light emitting intensity of the light beams such as infrared light.

As a result, when the distance between the pen device 1 and the screen 2 is greater, the reflection light may become weak. By contrast, when the distance between the pen device 1 and the screen 2 is smaller, the reflection light may become strong. When the distance between the pen device 1 and the screen 2 is small, and the reflection light is strong, the light receiving sensor 3 imaging the screen 2 causes halation. In this case, the control device 4 may fail to detect a light spot or may erroneously recognize the size of the light spot as being greater than the accrual size of the light spot. In such a case, an auto exposure function may be provided with the light receiving sensor 3 to control the amount of light entering the light receiving sensor 3. However, this may increase the burden on the light receiving sensor 3 side, thereby increasing structural complications of circuits to result in an increase in the fabrication cost, or increasing the software processing load to decrease the frame rate.

Thus, the following embodiment illustrates a configuration example of the pen device 1 capable of accurately detecting a light spot and capable of preventing the light receiving sensor 3 to cause halation without providing the auto exposure function with the light receiving sensor 3 side.

Figure 21:
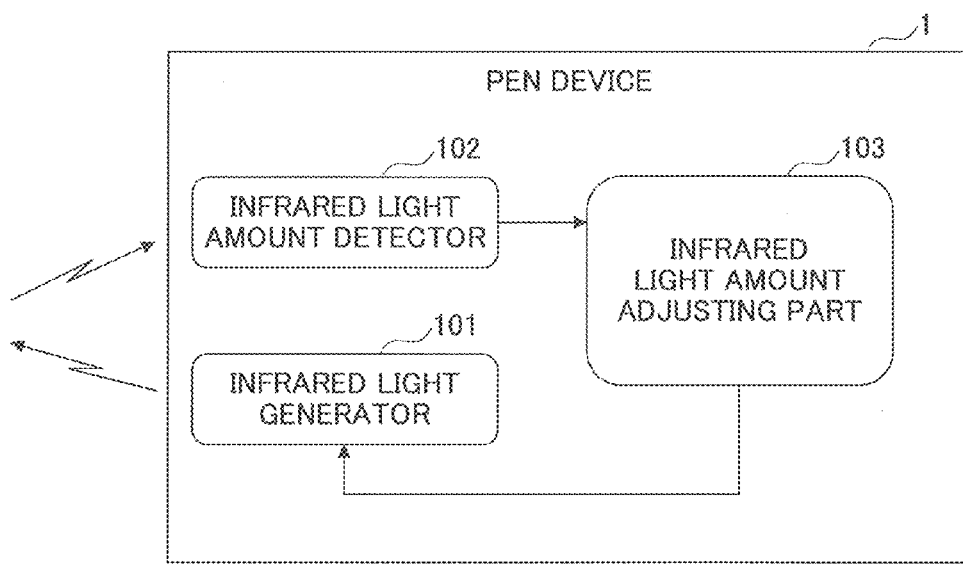
FIG. 21 is a diagram illustrating a configuration example of a pen device.

FIG. 21 is a diagram illustrating a configuration example of the pen device 1. In FIG. 21, the pen device 1 includes an infrared light generator 101, an infrared light amount detector 102, and an infrared light amount adjusting part 103. The infrared light amount adjusting part 103 is configured to allow the infrared light amount detector 102 to receive reflection light of the light beams emitted from the infrared light generator 101, and appropriately adjust the amount of light beams of the infrared light generator 101.

Figure 22:
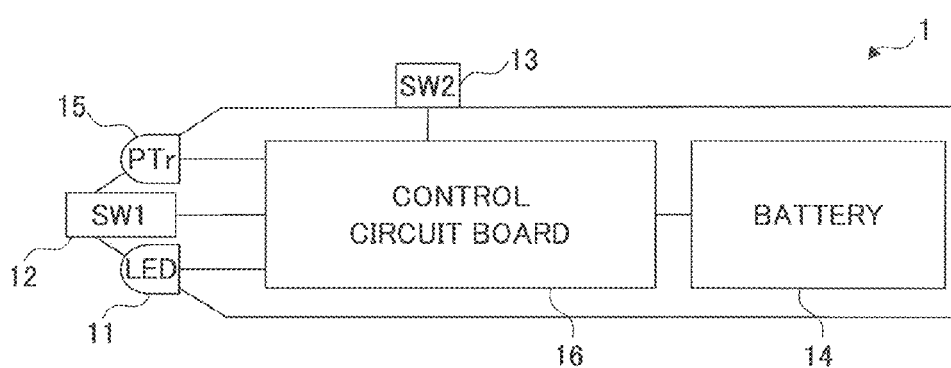
FIG. 22 is a diagram illustrating a specific configuration example of the pen device.

FIG. 22 is a diagram specifically illustrating a configuration example of the pen device 1. In FIG. 22, the pen device 1 includes a light transmitting element 11 such as an infrared LED at the front of the pen device 1, a light receiving element 15 such as a phototransistor, and a switch 12. The pen device 1 further includes a switch 13 on a lateral face of the pen device 1. The pen device 1 further incorporates a battery 14 and a control circuit board 16.

Figure 23:
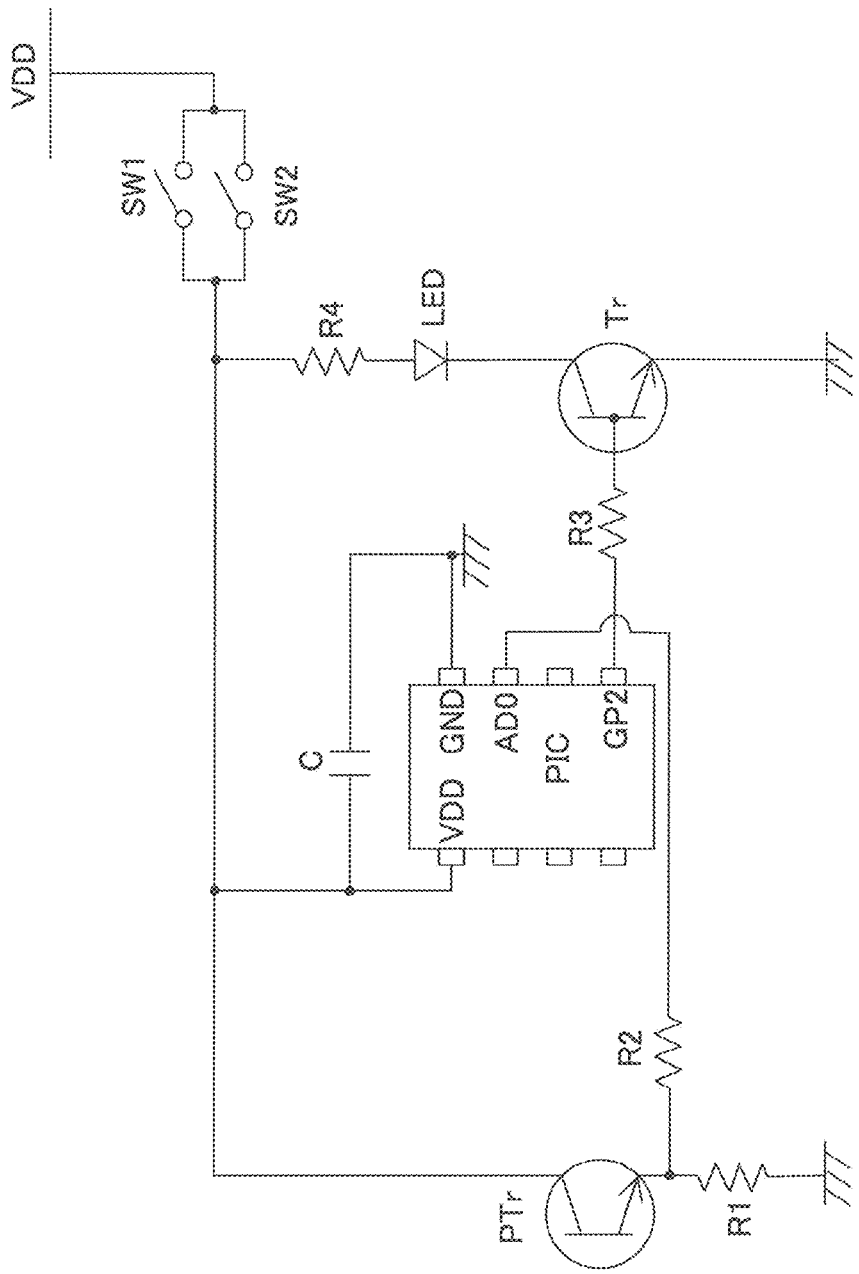
FIG. 23 is a diagram illustrating a circuit configuration example of the pen device.

FIG. 23 is a diagram illustrating a circuit configuration example of the pen device 1. In FIG. 23, switches SW1 and SW2 corresponding to the switches 12 and 13 are connected in parallel, and first ends of the switches SW1 and SW2 are connected to a power supply VDD corresponding to plus polarity of the battery 14. A series circuit of a collector-emitter of a phototransistor PTr and a resistor R1, a circuit of a power terminal and a ground terminal of a controller (microcomputer) PIC, and a series circuit of a resistor R4 and an infrared LED (see "LED" in FIG. 23) and a collector-emitter of a transistor Tr are connected between the second ends of the switches SW1 and SW2 and ground (corresponding to a minus polarity of the battery 14).

A noise cancelling capacitor C is connected in parallel with the power terminal and the ground terminal of the controller PIC. The emitter of the phototransistor PTr is connected to an analog input terminal AD0 of the controller PIC via a resistor R2. An output terminal GP2 of the controller PIC is connected to a base of the transistor Tr via a resistor R3. The output terminal GP2 of the controller PIC is configured to generate PWM (Pulse Width Modulation) control signals with predetermined duty.

The series circuit of the collector-emitter of the phototransistor PTr and the resistor R1 corresponds to an infrared light amount detector 102 configured to detect the amount of light received by the phototransistor PTr and convert the detected amount of light into a voltage. The circuit of the power terminal and the ground terminal of the controller PIC corresponds to the infrared light amount adjusting part 103 configured to allow the analog input terminal AD0 of the controller PIC to receive the voltage converted by the phototransistor PTr, adjust the PWM pulse width based on the received voltage using a program, and supply the adjusted PWM pulse width to the transistor Tr. The series circuit of the resistor R4, the infrared light LED ("LED" in FIG. 23), and the collector-emitter of the transistor Tr corresponds to the infrared light generator 101 configured to turn ON or OFF current supplied to the infrared light LED ("LED" in FIG. 23) based on the PWM output of the controller PIC.

Note that the power supply VDD is supplied to the phototransistor PTr and the controller PIC via the switches SW1 and SW2 in the above-described circuit example. However, the power supply VDD may alternatively be supplied to the phototransistor PTr and the controller PIC without intervention by the switches SW1 and SW2.

Figure 24:
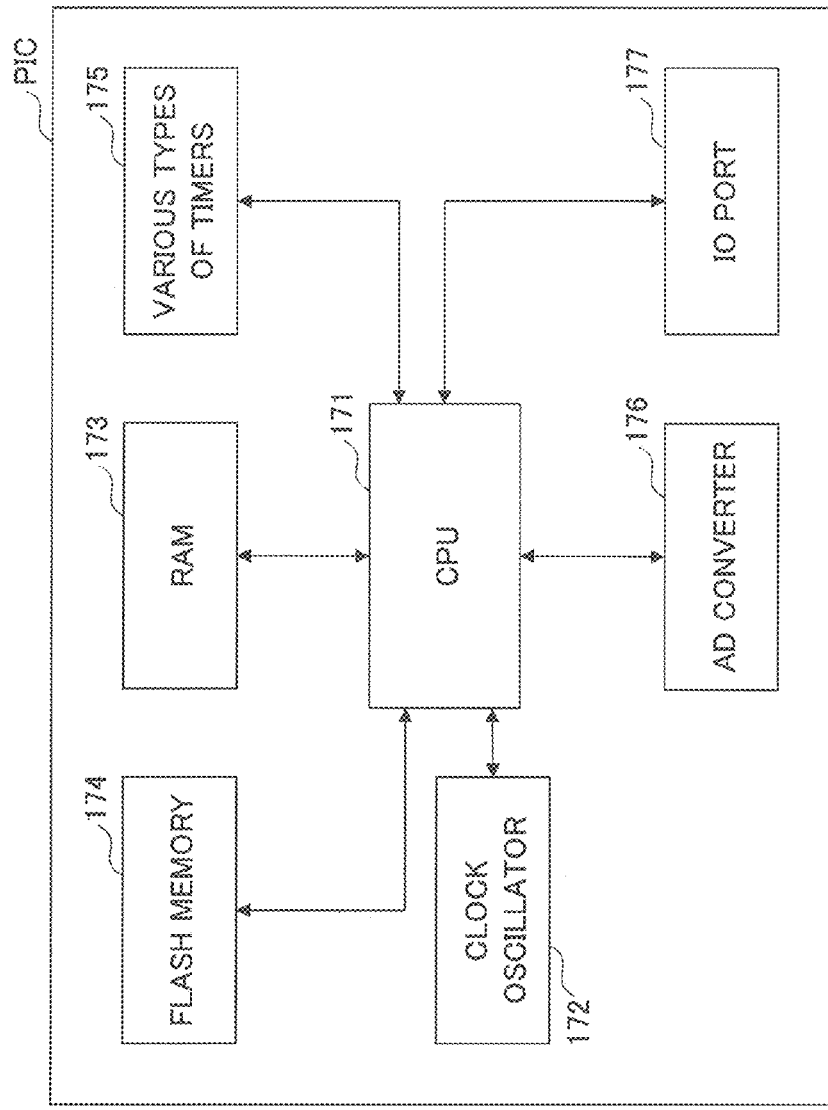
FIG. 24 is a diagram illustrating an internal configuration example of a controller of the pen device.

FIG. 24 is a diagram illustrating an internal configuration example of the controller PIC. In FIG. 24, the controller PIC includes a CPU (central processing unit) 171, a clock oscillator 172, a RAM (random access memory) 173, a flash memory 174, various types of timers 175, an AD converter 176, and an IO port 177. The CPU 171 is configured to execute a program loaded in the RAM serving as a work area based on the program and data stored in advance in the flash memory 174. The clock oscillator 172 is configured to supply clock signals to the CPU 171. The various types of timers 175 are configured to provide a timer function when the timer is used in the process. The AD converter 176 is configured to convert the analog signals input from the analog input terminal of the IO port 177 into digital data.

Figure 25:
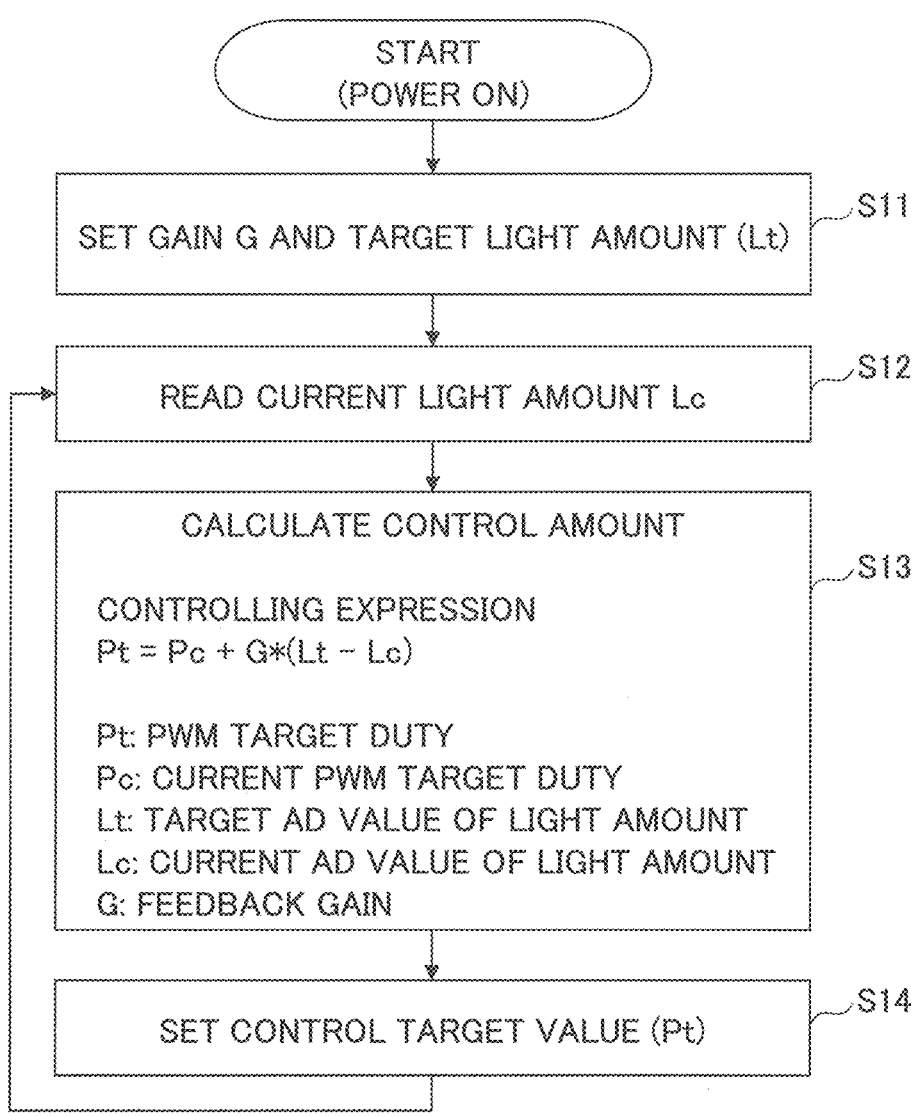
FIG. 25 is a flowchart illustrating a process example of the controller.

FIG. 25 is a flowchart illustrating a process example of the controller PIC. In FIG. 25, when the controller PIC is activated by the supply of the power, the controller PIC the controller PIC sets a target light amount Lt and gain G (step S11).

The controller PIC subsequently reads a current light amount Lc (step S12), and calculates a control amount (step S13). That is, the controller PIC calculates a PWM target duty Pt based on the following control formula:

$$Pt=Pc+G*(Lt-Lc),$$

where
Pt represents the PWM target duty,
Pc represents the current PWM duty,
Lt represents a target light amount AD,
Lc represents the current light amount AD, and
G represents feedback gain.

The controller PIC subsequently sets Pt as a control target (step S14), and reads the current light amount Lc (returns to step S12). The PWM control signal corresponding to the control target Pt is output to the output terminal GP2 of the controller PIC.

Figure 26A:
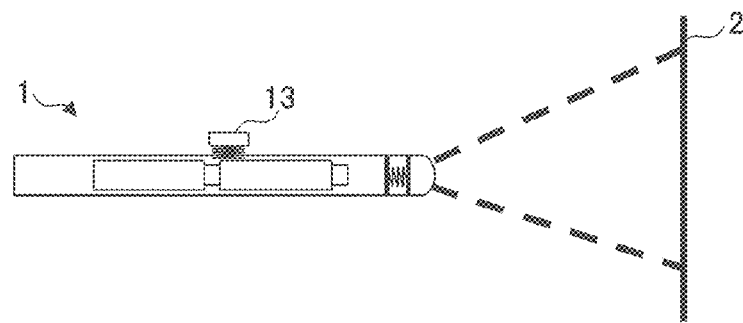
FIGS. 26A to 26C are diagrams illustrating a light amount adjusting process of the pen device 1.
Figure 26B:
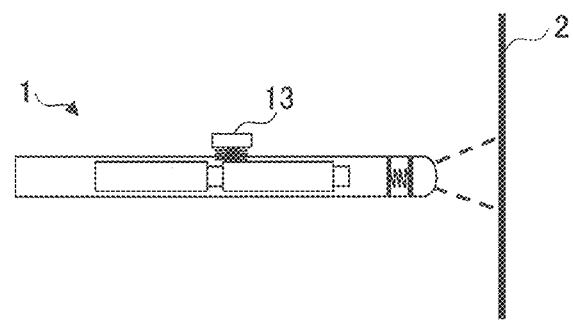
Figure 26C:
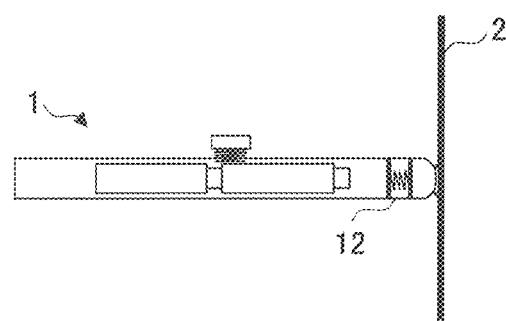

FIGS. 26A to 26C are diagrams illustrating a light amount adjusting process of the pen device 1. FIG. 26A illustrates a case in which the pen device 1 is fairly away from the screen 2, and the user may press the switch 13 to turn the light of the pen device 1 on. When the distance between the pen device 1 and the screen 2 is fairly large, the light reflected from the screen 2 becomes weak. Hence, the pen device 1 is adjusted to emit strong light beams.

FIG. 26B illustrates a case in which the pen device 1 is close to the screen 2 without being in contact with the screen 2, and the user may press the switch 13 to turn the light of the pen device 1 on. When the distance between the pen device 1 and the screen 2 is small, the light reflected from the screen 2 becomes strong. Hence, the pen device 1 is adjusted to dim the light beams.

FIG. 26C illustrates a case in which the pen device 1 is in contact with the screen 2, and the user presses the pen device 1 on screen 2 to pressurize the switch 12, thereby turning the light of the pen device 1 on without pressing the switch 13. When the distance between the pen device 1 and the screen 2 is small, the light reflected from the screen 2 becomes strong. Hence, the pen device 1 is adjusted to dim the light beams.

Outline

The disclosed embodiments may facilitate improving operability with respect to contents displayed on the screen.

The preferred embodiments are described above. The embodiments of the present invention are illustrated with specific examples; however, the present invention is not limited to these examples, and various alterations or changes may be made without departing from the gist and the scope of the claims of the present invention. Specifically, the present invention shall not be construed as being limited to details of the specific examples and accompanying drawings thereof.

The control device 4 is an example of a content display control device. The projector 5 is an example of a content image display unit. The light receiving sensor 3 is an example of a reflection light detector. The mode selector 41 is an example of a mode selector. The parameter adjusting part 42 is an example of a user operation detector. The image display controller 43 is an example of an image display controller.

Advantageous Effect

The disclosed embodiments may facilitate improving operability with respect to contents displayed on a screen.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A content display control method comprising:
    displaying a content image on a screen;
    detecting reflection light of a beam of light reflected off the screen, the beam of light being emitted from a portable device onto the screen;
    selecting, based on the detected reflection light, a desired one of modes set in association with states of the reflection light changed in accordance with a distance between the screen and the portable device;
    detecting a user's operation in a period from selecting the mode to turning off the beam of light, based on the state of the reflection light in association with the selected mode; and
    controlling display of the content image on the screen based on the detected user's operation,
    wherein the selecting of the mode includes selecting a desired mode in association with a combination of a size of a light spot and a central luminance of the reflection light on the screen.

2. The content display control method as claimed in claim 1, wherein
    when a desired mode is selected based on the reflection light, the selected mode is determined as a temporarily determined mode, and
    when the selected mode remains unchanged for a predetermined time, the predetermined time being set in accordance with a corresponding one of the modes, the selected mode is shifted from the temporarily determined mode to an actually determined mode.

3. The content display control method as claimed in claim 2, wherein
    a temporarily determined mode graphic is displayed at a central position of the beam of light in accordance with the selected mode determined as the temporarily determined mode, and
    an actually determined mode graphic is displayed at the central position of the beam of light in accordance with the selected mode determined as the actually determined mode.

4. The content display control method as claimed in claim 1, wherein
    the modes include a handwriting mode, a pan-tilt mode, and an overview mode that are set in accordance with an ascending order of the distance.

5. The content display control method as claimed in claim 1, wherein
    the portable device emits a beam of light onto the screen, detects the reflection light of the beam of light reflected off the screen, and controls the beam of light to be an emitting amount capable of being detected by a content display control device.

6. A content display control system comprising:
    a content image display unit configured to display a content image on a screen;

a portable device configured to emit a beam of light onto the screen;

a reflection light detector configured to detect reflection light of the beam of light reflected off the screen; and a content display control device including a mode selector configured to select, based on the detected reflection light, a desired one of modes set in association with states of the reflection light changed in accordance with a distance between the screen and the portable device, a user operation detector configured to detect a user's operation in a period from selecting the mode to turning off the beam of light, based on the state of the reflection light in association with the selected mode, and an image display controller configured to control display of the content image on the screen, based on the detected user's operation, wherein the mode selector selects a desired mode in association with a combination of a size of a light spot and a central luminance of the reflection light on the screen.

7. The content display control system as claimed in claim 6, wherein when the mode selector selects a desired mode based on the reflection light, the mode selector determines the selected mode as a temporarily determined mode, and when the selected mode remains unchanged for a predetermined time, the predetermined time being set in accordance with a corresponding one of the modes, the mode selector shifts the selected mode from the temporarily determined mode to an actually determined mode.

8. The content display control system as claimed in claim 7, wherein the image display controller displays a temporarily determined mode graphic at a central position of the beam of light in accordance with the selected mode determined as the temporarily determined mode, and an actually determined mode graphic at the central position of the beam of light in accordance with the selected mode determined as the actually determined mode.

9. The content display control system as claimed in claim 6, wherein the modes include a handwriting mode, a pan-tilt mode, and an overview mode that are set in accordance with an ascending order of the distance.

10. The content display control system as claimed in claim 6, wherein the portable device emits a beam of light onto the screen, detects the reflection light of the beam of light reflected off the screen, and controls the beam of light to be an emitting amount capable of being detected by the content display control device.

11. A non-transitory computer-readable recording medium storing a program, which when processed by processors, causes a computer to execute a process, the process comprising:

causing a content image display unit to display a content image on a screen;

causing a reflection light detector to detect reflection light of a beam of light reflected off the screen, the beam of light being emitted from a portable device onto the screen;

causing a mode selector to select, based on the detected reflection light, a desired one of modes set in association with states of the reflection light changed in accordance with a distance between the screen and the portable device;

causing a user operation detector to detect a user's operation in a period from selecting the mode to turning off the beam of light, based on the state of the reflection light in association with the selected mode; and causing an image display controller to control display of the content image on the screen based on the detected user's operation, wherein the mode selector selects a desired mode in association with a combination of a size of a light spot and a central luminance of the reflection light on the screen.

12. The non-transitory computer-readable recording medium as claimed in claim 11, wherein when the mode selector selects a desired mode based on the reflection light, the mode selector determines the selected mode as a temporarily determined mode, and when the selected mode remains unchanged for a predetermined time, the predetermined time being set in accordance with a corresponding one of the modes, the mode selector shifts the selected mode from the temporarily determined mode to an actually determined mode.

13. The non-transitory computer-readable recording medium as claimed in claim 12, wherein the image display controller displays a temporarily determined mode graphic at a central position of the beam of light in accordance with the selected mode determined as the temporarily determined mode, and an actually determined mode graphic at the central position of the beam of light in accordance with the selected mode determined as the actually determined mode.

14. The non-transitory computer-readable recording medium as claimed in claim 11, wherein the modes include a handwriting mode, a pan-tilt mode, and an overview mode that are set in accordance with an ascending order of the distance.

15. The non-transitory computer-readable recording medium as claimed in claim 11, wherein the portable device emits a beam of light onto the screen, detects the reflection light of the beam of light reflected off the screen, and controls the beam of light to be an emitting amount capable of being detected by the content display control device.

16. The content display control method as claimed in claim 1, wherein the desired one of modes is selected, based on a size of a light spot and a central luminance of the detected reflection light on the screen, from among a first plurality of modes corresponding to the size of the light spot in a first range in which a distance is not specified by the central luminance alone due to a gradual change in the size of the light spot, and a second plurality of modes corresponding to the central luminance with respect to the same size of the light spot in a second range other than the first range.

* * * * *